3,205,742
ADJUSTABLE PIERCE UNIT
Floyd M. Williamson, % Di-Dro Engineering Company,
2405 E. Grand Blvd., Detroit, Mich.
Filed July 11, 1963, Ser. No. 294,427
5 Claims. (Cl. 83—140)

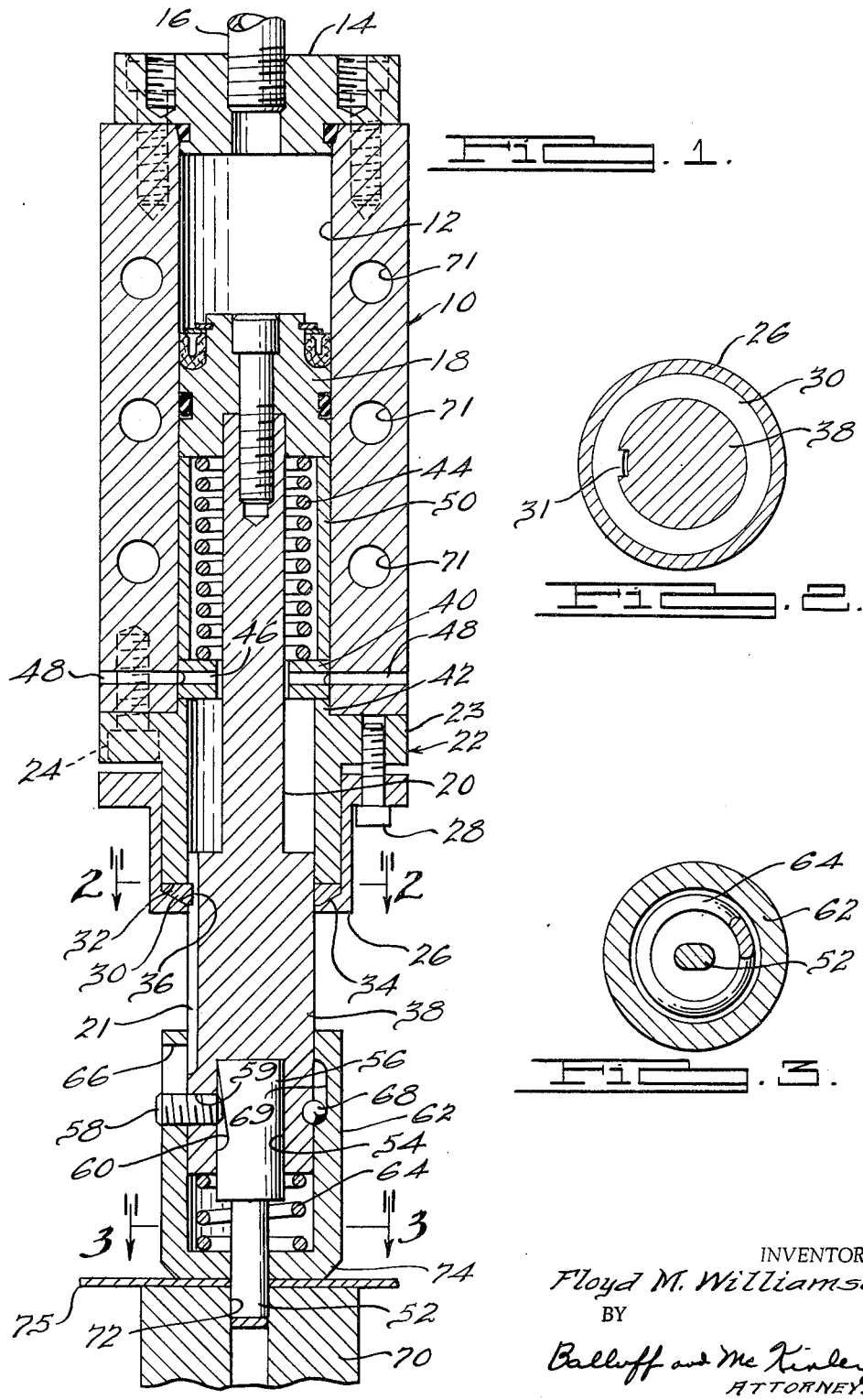

This invention relates to piercing units and has particular reference to an adjustable piercing unit which is constructed and arranged so as to facilitate alignment of the punch with the cooperating die member and adjustment of the length of stroke of the punch. The pierce unit of the present application is particularly adapted for use in hydraulic systems of the kind disclosed in my prior application Serial No. 91,362, filed February 24, 1961, now Patent No. 3,147,657, for "Hydraulically Actuated Piercing Unit," and of which the present application is a continuation-in-part.

The construction herein disclosed makes it possible to readily orient the punch with its die and also to change punches with a minimum of delay.

A principal object of the invention, therefore, is to provide a new and improved piercing unit which is constructed so as to facilitate adjustment or changing of the punch.

Other and further objects of the invention will be apparent from the following description and claims and may be understood by reference to the accompanying drawings, of which there is one sheet, which by way of illustration show a preferred embodiment of my invention and what I now consider to be the best mode of applying the principles thereof. Other embodiments of the invention may be used without departing from the scope of the present invention as set forth in the appended claims.

In the drawings:

FIG. 1 is a longitudinal sectional view of a hydraulic pierce unit embodying the invention, with the punch shown in its extended position; and FIGS. 2 and 3 are sectional views taken along the lines 2—2 and 3—3, respectively, of FIG.1.

As illustrated in the drawings, a piercing unit embodying the invention comprises a body 10 having a cylinder bore 12 and a detachable end plate 14 closing one end of the cylinder bore, the end plate being provided with a fluid connection 16 through which fluid is supplied to the bore 12. The fluid connection 16 may form a part of a hydraulic pressure system as disclosed in my prior application Serial No. 91,362, wherein such system functions to periodically supply hydraulic fluid under pressure to the bore 12 for actuating the pierce unit.

A hydraulic piston 18 is reciprocable in the bore 12 and is provided with a rod 20 which extends from one end of the bore 12. A bearing cap 22 secured to the body 10 slidably supports the piston rod 20 and is bolted to the body 10 by a series of bolts 24. A cup-shaped clamping sleeve 26 is removably secured over and to the bearing cap by a series of threaded bolts 28, and a lock washer 30 is clamped by and between the sleeve 26 on the bearing cap 22 for locking the piston rod 20 against rotation about its axis. The lock washer 30 seats against the end face 32 of the bearing cap. The opposite side 34 of the washer 30 is frusto-conical and is engaged by a correspondingly shaped surface 36 provided on the inside of the sleeve 26 so that when the sleeve 26 is drawn down onto the annular flange 23 of the bearing cap, the washer 30 will be frictionally clamped between the opposed surfaces of the cap 22 and the clamping sleeve 26, thereby preventing angular displacement or shifting of the washer 30 about its axis. The washer 30 includes an integral key 31 which is accommodated within an axial groove 21 formed in the periphery of the enlarged portion 38 of the piston rod 20 whereby the latter is locked against angular displacement about its axis when the clamping sleeve 26 is tight on the bearing cap 22.

A part of the bearing cap 22 projects into the end of the cylinder bore 12 for locating the cap 22 relative to the body 10, and a washer 40 in the bore 12 is seated against the end 42 of the bearing cap 22. A coil spring 44 is confined between the washer 40 and the piston 18 and biases the latter to its retracted position. The spring 44 is relatively heavy and exerts a substantial force for this purpose.

The washer 40 has an opening therethrough considerably larger than the size of the piston rod 20 and is provided with a diametral passage 46 which communicates with passages 48 in the body 10 for venting the bore 12 on the spring side of the piston 18. A collar or sleeve 50 is fitted in the bore 12 and seats against the washer 40 and cooperates with the piston 18 so as to form a stop therefor to limit the extent of forward travel of the piston 18. It will be evident that by removing the bolts 28 which secure the clamping sleeve to the bearing cap 22 and by removing the bolts 24 which secure the bearing cap to the body 10, the sleeve 50 may be replaced by a sleeve of greater or lesser length so as to decrease or increase the stroke of the piston 18 and correspondingly the stroke of the punch 52.

The enlarged portion or end 38 of the piston rod 20 is provided with a socket 54 for receiving and holding one end 56 of the punch 52. A set screw 58 threaded into a tapped hole in the socket 54 projects into a slot 60 in the tool 56 for securing the tool in the socket 54. A stripper sleeve 62 is slidable on the socket 54, and a coil spring 64 is confined between the socket 54 and the stripper 62 and biases the latter to its extended position. The screw 58 extends through a slot 66 in the stripper sleeve 62 and prevents rotation thereof.

A ball 68 projecting into an annularly extending groove in the outer periphery of the socket 54 and into an axially extending groove 69 formed in the inner surface of the sleeve 62 serves to limit the reciprocation of the stripper sleeve 62 relative to the socket 54. After removal of the screw 58 the sleeve 62 may be rotated 180° so as to move the ball into registry with the tapped hole 59 in the socket, and thus permit the axial separation of the sleeve 62 from the socket. The punch 52 may then be removed from the socket and another punch substituted.

The die 70 is provided with a cavity 72 in alignment with the punch 52, the die 70 and the body 10 of the pierce unit being fixed relative to each other upon a suitable support, body 10 being provided with bolt holes 71 for this purpose. In operation, the advance of piston 18 forces the nose end 74 of the stripper sleeve 62 into engagement with the work blank 75 so as to hold it against the die 70. Continued movement of the punch 52 causes it to pierce the blank 75, and the alignment of the die cavity 72 with the punch 52 permits the latter to enter the die cavity 72. When the fluid pressure in the cylinder bore 12 is released, the spring 44 retracts the punch 52 from the work blank 75 while the sleeve 62 under the influence of spring 64 serves to hold the blank 75 against the die 70. The punch 52 may be of any desired cross section.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A fluid actuated piercing unit comprising a body having a cylinder bore and a fluid connection through which fluid is supplied to one end of said bore, the other end of said bore being provided with a venting port, a piston reciprocable in said bore and provided with a rod which extends from the other end of said bore, a bearing cap secured to said body at said other end of said bore and through which said piston rod extends, said piston rod being axially slidably mounted in said cap and having an axial groove in the periphery thereof, a socket in the outer end of said piston rod, a punch having one end removably secured within said socket and projecting therefrom for cooperation with a die member, a cup-shaped clamping sleeve removably secured over said bearing cap, a washer around said piston rod and clamped by and between said sleeve and bearing cap and having an integral key extending into said groove in said piston rod so as to lock the latter and the punch carried thereby against rotation, a stripper slidably mounted for limited axial movement on said socket, and a spring housed within said stripper and biasing it to an extended position relative to said punch so as to clamp the work against the die prior to engagement of the punch with the work upon actuation of said piercing unit in response to the supply of fluid under pressure to said one end of said cylinder bore.

2. A piercing unit according to claim 1 wherein said washer and said clamping sleeve are provided with interengaging tapered surfaces whereby said washer is wedged between said sleeve and bearing cap.

3. A piercing unit according to claim 1 including a stop for said piston comprising a washer seated against said bearing cap, a collar seated against said washer, and a retracting spring within said collar and confined between said washer and said piston.

4. A piercing unit comprising a body having a reciprocable rod which extends from one end thereof, a bearing cap secured to said body and through which said rod extends, said rod being axially slidably mounted in said cap and having an axial groove in the periphery thereof, a socket in the outer end of said rod, a punch having one end removably secured within said socket and projecting therefrom for cooperation with a die member, a cup-shaped clamping sleeve removably secured over said bearing cap, a washer around said rod and clamped by and between said sleeve and bearing cap and having an integral key extending into said groove in said rod so as to lock the latter and the punch carried thereby against rotation, a stripper slidably mounted for limited axial movement on said socket, and a spring housed within said stripper and biasing it to an extended position relative to said punch so as to clamp the work against the die prior to engagement of the punch with the work upon actuation of said piercing unit.

5. A piercing unit according to claim 4 wherein said stripper comprises a sleeve provided with a slot, a set screw extending through said slot and threaded into said socket for securing said punch therein, said stripper sleeve having an axial groove on the inner surface thereof and said socket having an annular groove opposite said axial groove, and a ball in said grooves for limiting sliding movement of said stripper relative to said socket.

References Cited by the Examiner
UNITED STATES PATENTS

| | | | |
|---|---|---|---|
| 3,064,514 | 11/62 | Wilson | 83—639 X |
| 3,079,824 | 3/63 | Schott | 83—588 X |
| 3,107,565 | 10/63 | Hermanns | 83—588 X |
| 3,147,657 | 9/64 | Williamson | 83—140 |

ANDREW R. JUHASZ, *Primary Examiner.*